(12) United States Patent
Kim et al.

(10) Patent No.: US 11,948,440 B2
(45) Date of Patent: Apr. 2, 2024

(54) ELECTRIC FIRE PREDICTION MONITORING SYSTEM AND THE METHOD INCLUDING THE SAME

(71) Applicant: FS, Inc, Daejeon (KR)

(72) Inventors: Young Jin Kim, Daejeon (KR); Gi Ryung Kwon, Seoul (KR); Si Young Choi, Seoul (KR)

(73) Assignee: FS, Inc, Daejeon (KR)

( * ) Notice: Subject to any disclaimer, the term of this patent is extended or adjusted under 35 U.S.C. 154(b) by 210 days.

(21) Appl. No.: 17/608,479

(22) PCT Filed: Nov. 26, 2020

(86) PCT No.: PCT/KR2020/016903
§ 371 (c)(1),
(2) Date: Nov. 2, 2021

(87) PCT Pub. No.: WO2021/201369
PCT Pub. Date: Oct. 7, 2021

(65) Prior Publication Data
US 2022/0223020 A1 Jul. 14, 2022

(30) Foreign Application Priority Data
Mar. 31, 2020 (KR) .................. 10-2020-0039338

(51) Int. Cl.
*H04N 5/44* (2011.01)
*G06T 7/80* (2017.01)
(Continued)

(52) U.S. Cl.
CPC .............. *G08B 17/125* (2013.01); *G06T 7/80* (2017.01); *G06V 10/44* (2022.01); *G06V 20/52* (2022.01); *G08B 29/043* (2013.01)

(58) Field of Classification Search
None
See application file for complete search history.

(56) References Cited

U.S. PATENT DOCUMENTS 10,847,009 B1 * 11/2020 Sulucz .................... G01J 5/026
2007/0087311 A1 * 4/2007 Garvey, III ............. G01J 5/025
434/21
(Continued)

FOREIGN PATENT DOCUMENTS

JP 10-221163 A 8/1998
KR 20-0413246 Y1 4/2006
(Continued)

OTHER PUBLICATIONS

International Search Report dated Mar. 4, 2021 for PCT/KR2020/016903 and its English translation.

*Primary Examiner* — Munear T Akki (57) ABSTRACT

The present disclosure relates to a system and method for predicting and detecting the outbreak of a fire. In particular, the present disclosure includes a management server configured to store and output data, a state detection unit disposed in a given space (hereinafter referred to as a "detection space") becoming a target of detection and configured to transmit, to the management server, a detected value of a normal state or an abnormal state within the detection space, a detection space photographing unit configured to transmit, to the management server, a first screen obtained by photographing the detection space in the normal state in which a detected value detected by the state detection unit is less than a set value and a second screen obtained by photographing the detection space in the abnormal state in which a detected value detected by the state detection unit is the set value or more, an abnormal state determination unit configured to determine a dangerous situation when a detected value transmitted by the state detection unit is the set value or more and to transmit, to a management terminal, thermal image data measured through the second screen, and the manager terminal configured to communicate with the management server. Accordingly, the present disclosure (Continued)

provides an advantage in that a manager can predict and identify a fire outbreak danger point in advance.

15 Claims, 6 Drawing Sheets

(51) Int. Cl.
  *G06V 10/44* (2022.01)
  *G06V 20/52* (2022.01)
  *G08B 17/12* (2006.01)
  *G08B 29/04* (2006.01)

(56) References Cited

U.S. PATENT DOCUMENTS

| | | | |
|---|---|---|---|
| 2014/0148706 A1* | 5/2014 | Van Treeck | F24F 11/64 |
| | | | 600/474 |
| 2016/0116178 A1* | 4/2016 | Vega | F24F 11/523 |
| | | | 700/276 |
| 2017/0299440 A1 | 10/2017 | Chang et al. | |
| 2017/0300847 A1* | 10/2017 | Jones | G06Q 30/0202 |
| 2017/0374296 A1* | 12/2017 | Schmidt | G01J 5/10 |
| 2018/0268673 A1* | 9/2018 | Amir | G08B 13/19 |
| 2018/0306457 A1* | 10/2018 | Byers | G01J 5/026 |
| 2019/0309968 A1* | 10/2019 | Nalajala | F24F 11/523 |

FOREIGN PATENT DOCUMENTS

| | | |
|---|---|---|
| KR | 10-2014-0013233 A | 2/2014 |
| KR | 10-1647423 B1 | 8/2016 |
| KR | 10-1979247 B1 | 5/2019 |

\* cited by examiner

ELECTRIC FIRE PREDICTION MONITORING SYSTEM AND THE METHOD INCLUDING THE SAME

CROSS-REFERENCE TO RELATED APPLICATIONS

This application is a § 371 national phase entry of International Application No. PCT/KR2020/016903, filed on Nov. 26, 2020, which claims priority and benefits of Korean Application No. 10-2020-0039338, filed Mar. 31, 2020, the disclosures of which are incorporated herein by reference in their entirety.

TECHNICAL FIELD

The present disclosure relates to a system and method for predicting the outbreak of a fire.

BACKGROUND ART

There emerges a strong need for a security and fire detection system in a large-sized composite building, structure, tunnel, etc. with the growth of the industry, but a detector which may be actually applied is very limited. In particular, a spark detector available for an initial fire alarm having a fast response speed has a short detection range having a maximum of 50 m and always has a danger of a malfunction. Furthermore, the spark detector has a problem in that the expansion of complex applications, such as integrated monitoring, is limited because the detector can transmit only a detection signal through a contact signal.

A conventional fire detector is a simple system for detecting a temperature, smoke, etc. as a fire when the temperature, smoke, etc. has a preset value or more by using a sensor for sensing the temperature, smoke, etc., generating an alarm by using a lamp or other device, and notifying a fire station of the outbreak of a fire by using a fire newsflash facility. Many complaints are raised with the conventional fire detector because a fire station and a manager have to be frequently dispatched due to frequent decision errors.

Furthermore, conventionally, upon data communication of a thermal image camera or a CCTV camera, a method using Wi-Fi, LTE, or Ethernet that requires the high speed transmission of a large amount of data is used. However, such a method is impossible when a small amount of low-speed camera data is communicated using an IoT-based sensor network.

Furthermore, the type of fire may be divided into an electric fire attributable to an electrical short circuit and a common fire attributable to a common cause other than an electric fire. However, a fire detection system for distinguishing and detecting an electric fire and a common fire in an integrated way is never present.

PRIOR ART DOCUMENT

Patent Document

Korean Utility Model Application Publication No. 20-0413246 (Mar. 29, 2006)

DISCLOSURE

Technical Problem

Accordingly, the present disclosure has been made in order to solve the above problems, and an object of the present disclosure is to provide a system and method for predicting and detecting the outbreak of a fire, which can prevent a danger of a fire and also enables measures to be rapidly taken when a fire occurs in a way to enable data to be smoothly transmitted over an IoT-based communication network by using a thermal image data compression technology for detecting a danger of a fire.

Furthermore, an object of the present disclosure is to provide a system and method for predicting and detecting the outbreak of a fire, which can prevent a danger of a fire and also enables a manager to rapidly take measures when the danger occurs by visually directly identifying the outbreak of a fire or a danger of the outbreak of a fire because a fire outbreak danger point at which a danger of the outbreak of a fire is identified is imaged and transmitted.

Technical objects of the present disclosure are not limited to the aforementioned technical objects, and other technical objects not described above may be evidently understood by a person having ordinary knowledge in the art from the following detailed description.

Technical Solution

In order to achieve the objects, a system for predicting and detecting the outbreak of a fire according to the present disclosure may include:
 a management server configured to store and output data,
 a state detection unit disposed in a given space (hereinafter referred to as a "detection space") becoming a target of detection and configured to detect a normal state or an abnormal state within the detection space or transmit a detected value to the management server,
 a detection space photographing unit configured to transmit, to the management server, a first screen obtained by photographing the detection space in the normal state in which a detected value detected by the state detection unit is less than a set value and a second screen obtained by photographing the detection space in the abnormal state in which a detected value detected by the state detection unit is the set value or more,
 an abnormal state determination unit configured to determine a dangerous situation when a detected value transmitted by the state detection unit is the set value or more and to transmit, to the management server and/or the manager terminal, thermal image data measured through the second screen, and
 a manager terminal configured to communicate with the management server.

In an embodiment of the present disclosure, the detection space photographing unit may have a function for
 calibrating and compressing the second screen through calibration so that the second screen coincides with a fire outbreak location measured in the thermal image data, and
 transmitting the calibrated and compressed thermal image and location data to the management server.

In an embodiment of the present disclosure, the thermal image data measured through the second screen may be datafied in a contour line form by incorporating a temperature distribution at a fire outbreak danger point and transmitted to the management server.

In an embodiment of the present disclosure, the datafication of the contour line may be calculated using an equation generated by Equation 1 below.

$$T(x, y) = \text{T\_max} - W * R(R = 0.1 \text{ to R\_max}) \quad (1)$$

x,y: middle temperature coordinates (pixels)
T_max: a middle temperature (° C.)
W: a weight (gain)
R: a radius pixel
R_max: a maximum radius.

In an embodiment of the present disclosure, the datafication of the contour line may be calculated by the Equation 1, and when the temperature distribution is measured in an oval form, the datafication of an oval contour line may be measured based on the datafication of the contour line by using an equation generated by Equation 2 below.

$$T(v, r): (v \rightarrow) = T(x, y) * r \quad (2)$$
$$: (v \leftarrow) = T(x, y)$$

x,y: middle temperature coordinates (pixels)
T_max: a middle temperature (° C.)
W: a weight (gain)
R: a radius pixel
R_max: a maximum radius
v: a diffusion vector direction (0 to 8)
r: a minimum and maximum ratio (1:1 to 1:16)

In an embodiment of the present disclosure, the datafication of the oval contour line may include extracting the temperature distribution by integrating a value according to Equation 2 and fast Fourier transform (FFT) analysis.

In an embodiment of the present disclosure, at least one detection space photographing unit may be provided and may have a function capable of monitoring a given space which is the target to be detected in real time and measuring and transmitting a thermal image.

In an embodiment of the present disclosure, the thermal image data may include at least one of sensor information, a thermal image, and a location of a warning part.

In an embodiment of the present disclosure, the management server and the manager terminal may mutually perform transmission and reception over a wireless network, and the wireless network may be an IoT-based sensor network.

In an embodiment of the present disclosure, the system may further include a gateway which mediates the transmission of the data from the abnormal state determination unit to the management server.

In an embodiment of the present disclosure, communication between the abnormal state determination unit and the gateway may include any one of wireless communication or wire communication capable of bidirectional communication.

In an embodiment of the present disclosure, the abnormal state determination unit may include:
a fire detection unit disposed in the detection space and configured to detect configuration factor information directly related to a fire, and
an environment detection unit disposed in the detection space and configured to detect environment factor information within the detection space as information other than configuration factor information related to the fire detection unit.

In an embodiment of the present disclosure, the abnormal state determination unit may
classify a risk state of the detection space based on a use aspect of the detection space and store the risk state in the management server, and
transmit, to a user, a risk state level of the detection space detected by the state detection unit and the environment factor information of the detection space when a detected value transmitted by the state detection unit is less than the set value.

In an embodiment of the present disclosure, the first screen may include a video or an image obtained by photographing any one of the detection space in which a user is not present, the detection space in which power is not used, and the detection space in which a user is not present in a time zone separately set by a user through the detection space photographing unit.

In an embodiment of the present disclosure, the system may further include a controller configured to control a breaker at a corresponding fire outbreak location to be automatically blocked when fire outbreak location data is transmitted from the abnormal state determination unit to the management server or a fire outbreak location is identified by the detection space photographing unit.

Furthermore, the present disclosure provides a method capable of predicting and detecting a danger of the outbreak of a fire using a system for predicting and detecting the outbreak of a fire. The method may include:
detecting an internal state of a panel board casing,
determining whether the internal state of the panel board casing is abnormal or normal based on a preset value,
determining the internal state of the panel board casing to be dangerous when the internal state reaches a preset primary critical value and transmitting a primary warning signal to a management server, and
compressing thermal image data measured through a thermal image camera along with a secondary warning signal when the internal state of the panel board casing reaches a preset secondary critical value and transmitting the compressed thermal image data to the management server over an IoT-based communication network.

In an embodiment of the present disclosure, the thermal image data measured through the thermal image camera may be datafied in a contour line form indicative of a temperature distribution at a fire outbreak danger point and transmitted in an image form in a way to be visually identified by a manager.

In an embodiment of the present disclosure, transmitting the thermal image data to the management server may further include:
calibrating a location of the thermal image data measured through the thermal image camera at a fire outbreak danger point and a location of the thermal image camera.

Advantageous Effects

The system and method for predicting the outbreak of a fire according to the present disclosure has effects in that a danger of a fire can be prevented and measures can be rapidly taken when a fire occurs in a way to enable data to be smoothly transmitted over an IoT-based communication network by applying a thermal image data compression technology for detecting a danger of a fire.

Furthermore, the system and method for predicting the outbreak of a fire according to the present disclosure has an effect in that a manager can more visually identify the outbreak of a fire or a danger of the outbreak of a fire and rapidly take measures by directly identifying the outbreak of the fire or the danger of the outbreak of the fire because a fire outbreak danger point at which a danger of the outbreak of a fire is identified is imaged and transmitted.

MODE FOR INVENTION

Hereinafter, an embodiment of a system and method for predicting and detecting the outbreak of a fire according to the present disclosure will be described in detail with reference to the accompanying drawings. In adding reference numerals to the elements of each drawing, it should be noted that the same elements have the same reference numerals as much as possible even if they are displayed in different drawings. Furthermore, in describing embodiments of the present disclosure, when it is determined that a detailed description of the related well-known configuration or function hinders understanding of an embodiment of the present disclosure, the detailed description thereof will be omitted.

Furthermore, in describing elements of an embodiment of the present disclosure, terms, such as a first, a second, A, B, (a), and (b), may be used. Such terms are used only to distinguish one component from the other component, and the essence, order, or sequence of a corresponding component is not limited by the terms. All terms used herein, including technical or scientific terms, have the same meanings as those commonly understood by a person having ordinary knowledge in the art to which an embodiment pertains, unless defined otherwise in the specification. Terms, such as those commonly used and defined in dictionaries, should be construed as having the same meanings as those in the context of a related technology, and are not construed as being ideal or excessively formal unless explicitly defined otherwise in the specification.

In the entire specification, when it is said that any part "comprises or includes" any element, it means that the part does not exclude any element, but may further include another element unless specially described to the contrary without excluding another element.

In general, a thermal image camera and a CCTV camera has a problem in that the transmission of data is impossible over an IoT-based sensor network due to a communication load.

Accordingly, the present disclosure may provide various effects, such as the simplification of communication means, convenient usability, and cost saving, by integrating and transmitting thermal image data and location data of a point of a danger of a fire outbreak or the outbreak of a fire photographed from the thermal image data in addition to sensor information included in an electrical facility including a panel board.

Furthermore, a social loss according to false reporting for the outbreak of a fire can be prevented by transmitting a warning or alarm through a dangerous signal of electrical safety caused by a leakage current attributable to carbonization in addition to a danger of an accident attributable to a fire in a common facility in addition to an electrical facility including a panel board.

Figure 1:
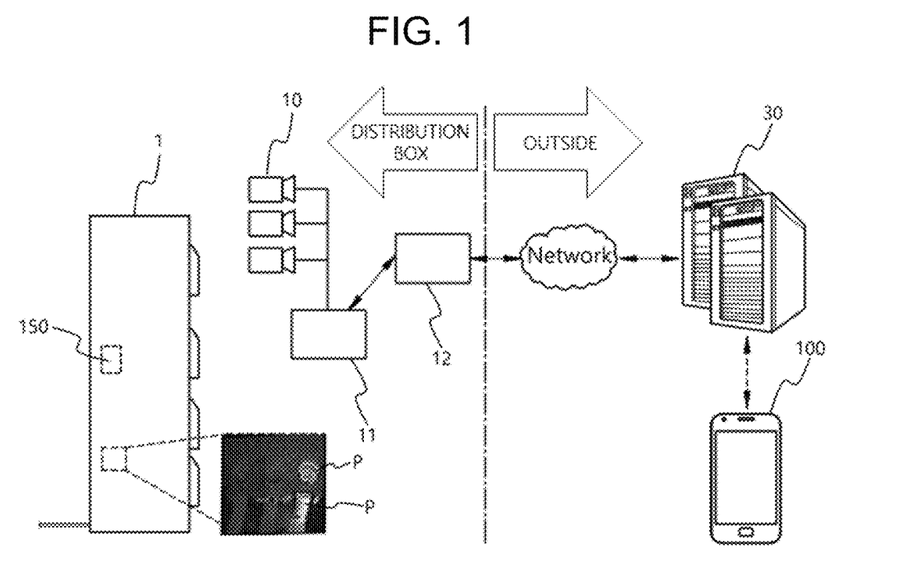
FIG. 1 is a diagram of a system for predicting and detecting the outbreak of a fire according to an embodiment of the present disclosure.
Figure 2:
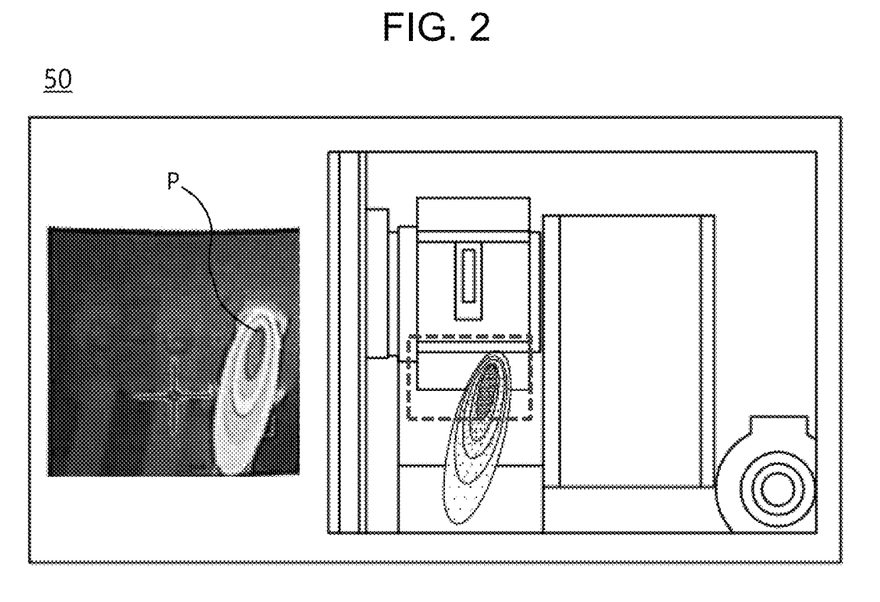
FIG. 2 is an exemplary diagram in which the outbreak location of a fire is identified by the system for predicting and detecting the outbreak of a fire according to an embodiment of the present disclosure.
Figure 3:
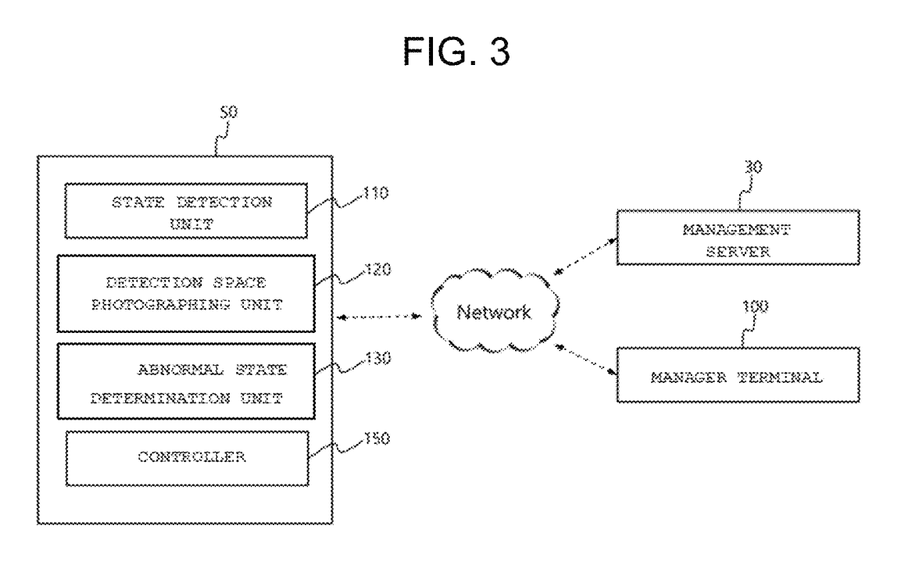
FIG. 3 is a construction diagram of the system for predicting and detecting the outbreak of a fire according to an embodiment of the present disclosure.

FIG. 1 is an exemplary diagram of a system for predicting and detecting the outbreak of a fire according to an embodiment of the present disclosure. FIG. 2 is an exemplary diagram in which the outbreak location of a fire is identified by the system for predicting and detecting the outbreak of a fire according to an embodiment of the present disclosure. FIG. 3 is a construction diagram of the system for predicting and detecting the outbreak of a fire according to an embodiment of the present disclosure.

Referring to FIGS. 1 to 3, the system for predicting and detecting the outbreak of a fire according to an embodiment of the present disclosure may include a management server 30 storing and outputting data, a state detection unit 110 disposed in a panel board and transmitting, to the management server 30, a detected value of a normal state or an abnormal state within a panel board casing 50, a detection space photographing unit 120 transmitting, to the management server 30, a photographing screen of the panel board casing 50 having the normal state in which a detected value detected by the state detection unit 110 is less than a set value, an abnormal state determination unit 130 determining, as a dangerous situation, a detected value transmitted by the state detection unit 110 when the detected value is the set value or more and transmitting, to a manager terminal, thermal image data as a photographing screen measured through the detection space photographing unit 120, and the manager terminal 100 communicating with the management server 30.

The state detection unit 110 is provided within the panel board casing 50, and may detect the normal state or the abnormal state within an electrical facility 1 by detecting a state within the electrical facility 1 in real time. The state detection unit 110 may provide information for enabling the abnormal state determination unit 130 to be described later to determine whether the inside of the panel board casing 50 is abnormal. The state detection unit 110 includes various types of separate sensors (not illustrated). A detected value measured through the sensor may be transmitted to the abnormal state determination unit 30 through a gateway 12 in a wired or wireless form. Preferably, the state detection unit 110 may transmit a detected value to the management server 30 by using an IoT-based sensor network for wireless communication, such as Zigbee, LoRa, SigFox, or NB IoT. In some cases, the state detection unit 110 may transmit a detected value by using any one of wireless communication, including Wi-Fi, CDMA, LTE, or common RF communication, and wire communication, including wire communication including RS485, Modbus, Ethernet, or CAN communication.

The abnormal state determination unit 130 may determine whether the inside of the panel board casing 50 is abnormal, may differently set a set value depending on a use aspect of the panel board casing 50, and may transmit an abnormal signal to the management server 30 and the manager terminal 100 when a state within the panel board casing 50 is determined to be an abnormal state. In this case, the abnormal state determination unit 130 may transmit a location of the thermal image camera 10 to the management server 30 by calibrating and compressing the location of the thermal image camera 10 so that the location of the thermal image camera 10 coincides with a location of corresponding thermal image data whose "abnormal state" is identified based on data provided by the thermal image camera 10 and the thermal image data extracted from an image.

The detection space photographing unit 120 may photograph an internal state by substantially scanning each point within the panel board casing 50. For example, the detection space photographing unit 120 may include a case where "the normal state" is displayed and a case where "the abnormal state" is displayed. A screen photographed by the detection space photographing unit 120 may include a video or an image.

In this case, the detection space photographing unit 120 may include at least one thermal image camera 10, and may be electrically connected to a thermal image camera controller 11 transmitting the video or image photographed by the at least one thermal image camera 10. The thermal image camera controller 11 may transmit the video or image to the management server 30 through the wired and wireless gateway 12.

At least one thermal image camera 10 is installed at each selected place, and monitors each point within the panel board casing 50 so that a fire outbreak danger point is monitored in real time. Accordingly, a thermal image camera 10 at a fire outbreak danger point among the plurality of thermal image cameras 10 may detect heat occurring at the corresponding point. That is, the thermal image camera 10 may directly photograph a point at which the heat occurs, and may store "the abnormal state" in the form of video or image data. The aforementioned "abnormal state" may include a mechanical outbreak of a fire in the electrical facility 1, the panel board within the electrical facility 1, a breaker type, etc. or an electrical outbreak of a fire, such as a short circuit, an overcurrent, a leakage current, etc. occurring in an electric wire.

A detailed example in which a fire outbreak danger point through the thermal image camera 10 is scanned is more specifically described with reference to following drawings.

The management server 30 functions to bidirectionally transmit and receive and provide data in response to a request from the manager terminal 100. All of such data may be stored in a database (not illustrated). The management server 30 may be configured as a system including a single device or a plurality of devices.

The manager terminal 100 is equipment capable of communication over a wireless network. Various embodiments of a wireless terminal may include not only a cellular phone, a smartphone having a wireless communication function, a personal digital assistant (PDA) having a wireless communication function, a wireless modem, a portable computer having a wireless communication function, a photographing device such as a digital camera having a wireless communication function, music storage and playback home appliances having a wireless communication function, and Internet home appliances capable of wireless Internet access and browsing, but a handheld unit or terminal in which combinations of such functions are integrated, but the present disclosure is not limited thereto.

Figure 4:
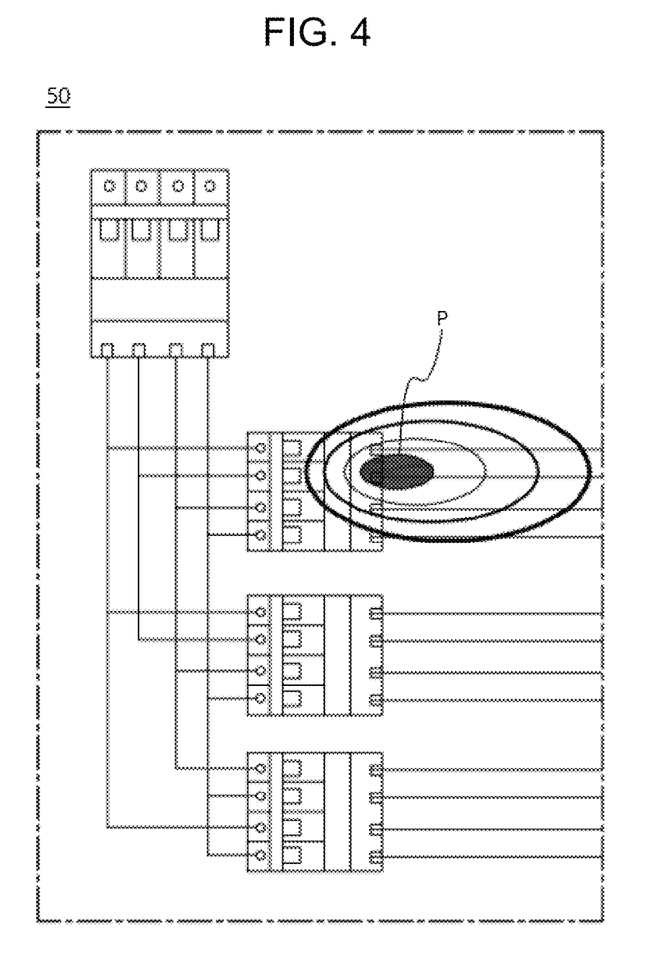
FIGS. 4 and 5 are exemplary diagrams in which the system for predicting and detecting the outbreak of a fire according to an embodiment of the present disclosure measures the outbreak of a fire.
Figure 5:
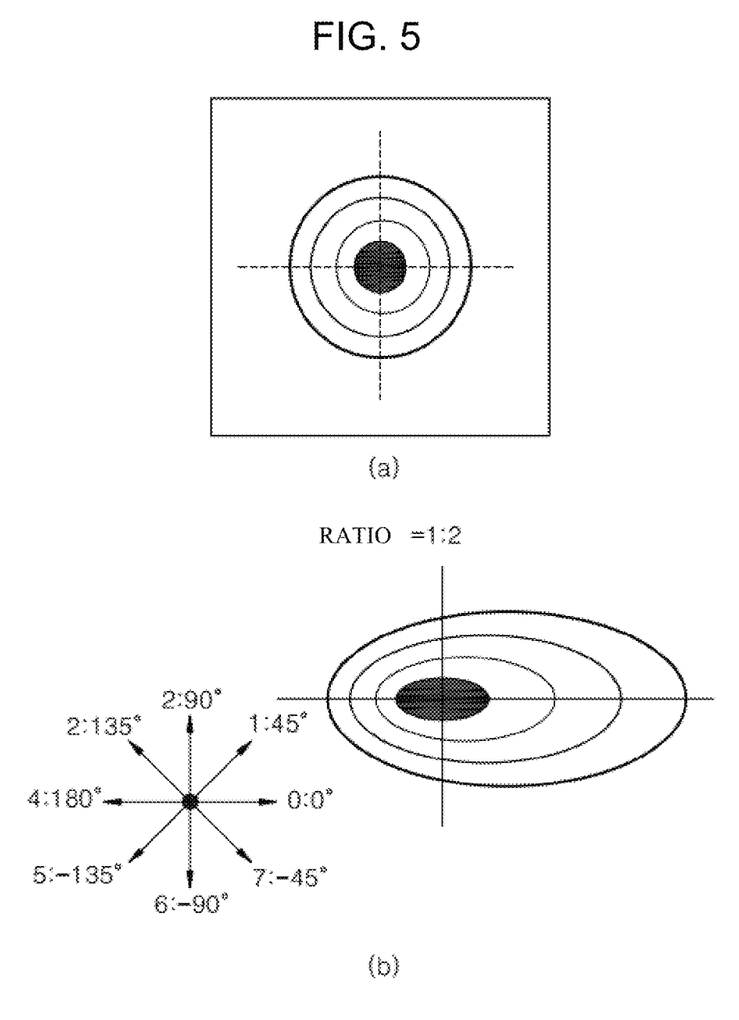
Figure 6:
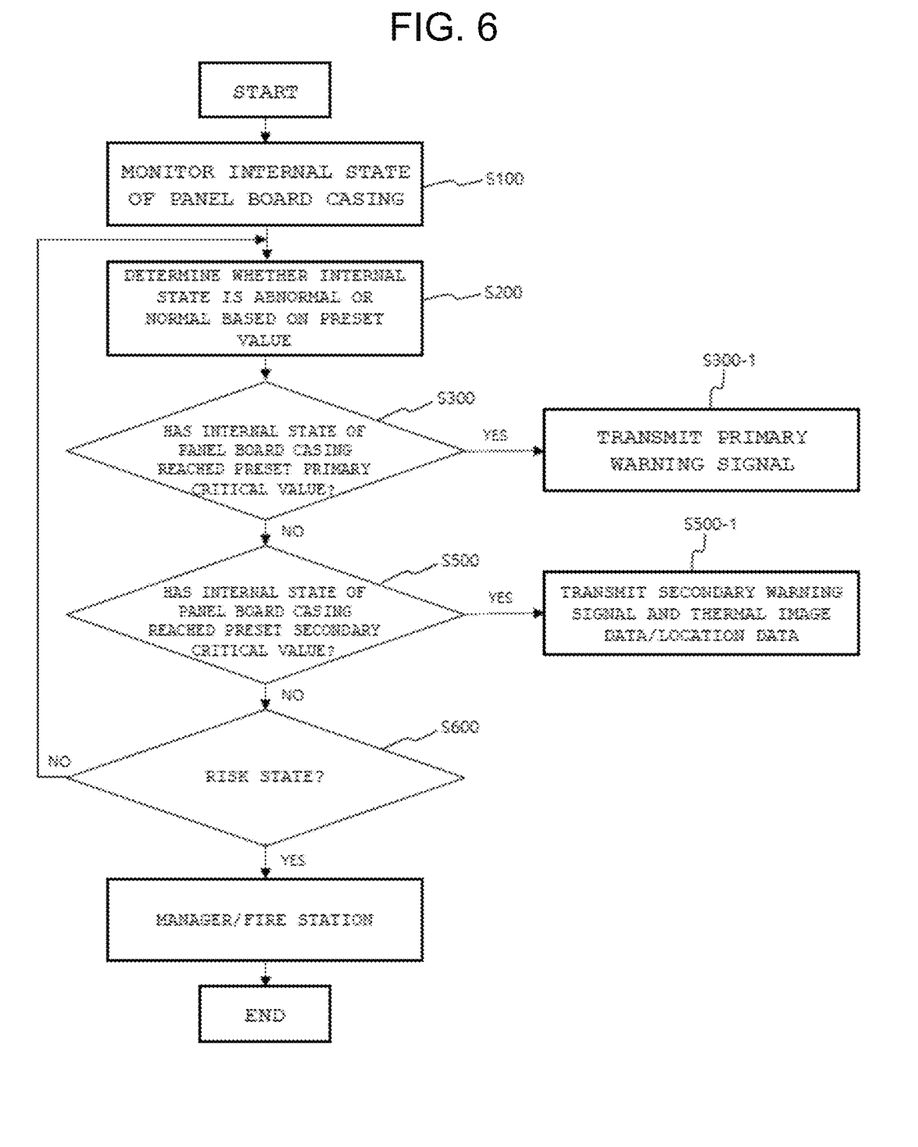
FIG. 6 is a flowchart illustrating a detecting method of the system for predicting and detecting the outbreak of a fire according to an embodiment of the present disclosure.

FIGS. 4 and 5 are exemplary diagrams in which the system for predicting and detecting the outbreak of a fire according to an embodiment of the present disclosure measures the outbreak of a fire. FIG. 6 is a flowchart illustrating a detecting method of the system for predicting and detecting the outbreak of a fire according to an embodiment of the present disclosure.

Referring to FIGS. 4 and 5, as described above, the system for predicting and detecting the outbreak of a fire according to the present disclosure may include the management server 30 storing and outputting data, the state detection unit 110 disposed in a panel board and transmitting, to the management server 30, a detected value of a normal state or an abnormal state within a panel board casing 50, the detection space photographing unit 120 transmitting, to the management server 30, a photographing screen of the panel board casing 50 having the normal state in which a detected value detected by the state detection unit 110 is less than a set value, the abnormal state determination unit 130 determining, as a dangerous situation, a detected value transmitted by the state detection unit 110 when the detected value is the set value or more and transmitting, to the manager terminal, thermal image data as a photographing screen measured through the detection space photographing unit 120, and the manager terminal 100 communicating with the management server 30.

In this case, thermal image data photographed by the thermal image camera 10, that is, the detection space photographing unit 120 according to the present disclosure, may be datafied in a contour line form by incorporating a fire danger point or a temperature distribution at a fire outbreak (danger) point P, and may be transmitted to the management server 30.

In general, when a fire occurs, a high temperature occurs. Such a temperature distribution has a characteristic in which the distribution is gradually spread from a center point. A temperature distribution for an area may be datafied and digitized in a contour line form based on such a physical characteristic.

Specifically, as illustrated in FIGS. 3 and 4, when a fire occurs in a given part within the panel board casing 50, the thermal image camera 10 located at a corresponding point may visually identify a general tendency of the fire, such as a temperature distribution and a location, by using a contour line extraction method based on the center point of the fire outbreak. In this case, according to the present disclosure, the contour line extraction method may be calculated by Relation 1 below.

$$T(x, y) = T\_max - W * R(R = 0.1 \text{ to } R\_max) \quad (1)$$

x,y: middle temperature coordinates (pixels)
T_max: a middle temperature (° C.)
W: a weight (gain)
R: a radius pixel
R_max: a maximum radius In this case, preferably, a thermal image may be calibrated and compressed through calibration so that the thermal image coincides with a location where the fire photographed by the thermal image camera 10 that photographs a fire outbreak (danger) point P occurs or a danger of the fire is present. Such calibrated and compressed thermal image data may be transmitted to the management server 30. Accordingly, a temperature distribution for a fire outbreak area may be datafied in a relatively small amount of data in a contour line form, and may be transmitted over an IoT-based sensor network having a small capacity.

In some cases, when the temperature distribution at the fire outbreak point identified through the thermal image camera 10 is checked in an oval contour line form, the temperature distribution may be calculated into Relation 2 below by using the factors checked through Relation 1. In this case, oval contour line extraction (fast Fourier transform (FFT)) analysis may be integrated and applied. That is, assuming that a highest temperature is a zero point, a transverse axis is a distance, and a longitudinal axis is a temperature, the temperature distribution at the fire outbreak (danger) point P may be accurately extracted by interpreting information received from the management server 30 in an oval contour line extraction (FFT) manner.

$$T(v, r): (v \rightarrow) = T(x, y) * r \qquad (2)$$

v: a diffusion vector direction (0 to 8)
r: a minimum and maximum ratio (1:1 to 1:16)

In this case, a diffusion vector direction (v→) may be represented using only 4 bits because the diffusion vector direction has nine numbers of 0 to 8. Since the minimum and maximum ratio (r) may be represented using only 4 bits up to 1:16, a value T(v,r) in Equation 2 may be represented using 1 byte. Accordingly, in order to represent one temperature contour line, 6 bytes may be required. Accordingly, a temperature distribution for a fire outbreak area can be datafied as a relatively small amount of data in a contour line form and transmitted over an IoT-based sensor network having a small capacity, etc.

The present disclosure may predict and detect the outbreak of a fire by using the system for predicting and detecting the outbreak of a fire.

As illustrated in FIG. 6, a method of predicting and detecting the outbreak of a fire may include a step S100 of detecting an internal state of the panel board casing 50, a step S200 of determining whether the internal state of the panel board casing 50 is abnormal or normal based on a preset value, a step S300-1 of determining that the internal state of the panel board casing 50 is dangerous when the internal state of the panel board casing 50 reaches a preset primary critical value and transmitting a primary warning signal to the management server 30, a step S500-1 of compressing thermal image data measured through the thermal image camera along with a secondary warning signal when the internal state of the panel board casing 50 reaches a preset secondary critical value and transmitting the compressed thermal image data to the management server over an IoT-based communication network, and a step S600 of continuously monitoring a risk state within the panel board casing 50. In this case, in some cases, the set value may be updated depending on whether a manager is present within the panel board casing 50.

For example, the state detection unit 110 may monitor the normal or abnormal state within the panel board casing 50 in real time. At this time, the state detection unit 110 can communicate with the thermal image camera 10. The internal state may be visually imaged and stored by the plurality of thermal image cameras 10 disposed in the panel board casing 50.

When a detected value measured by the state detection unit 110 reaches up to a set value of the preset primary critical value, the abnormal state determination unit 130 may transmit the primary warning signal to the management server 30. Accordingly, monitoring through the thermal image camera 10 disposed at a corresponding fire outbreak danger point can be enhanced by the management server 30.

Next, when a detected value measured by the state detection unit 110 at the corresponding fire outbreak danger point reaches a set value of the preset secondary critical value, the abnormal state determination unit 130 may transmit the secondary warning signal to the management server 30. At this time, thermal image data photographed by the thermal image camera 10 and extracted in a contour line form may be compressed in a form, such as an image which can be visually identified, and transmitted to the management server 30 in a way to be identified through the manager terminal 100 communicatively connected to the management server 30. Accordingly, a manager can finally determine a risk state, can identify the outbreak of a fire, and can take measures. In this case, the supply of power can be directly blocked through a panel board controller 150 disposed in the panel board 50.

Although not illustrated in the drawings presented by the present disclosure, the system for predicting and detecting the outbreak of a fire may also be applied to an electrical facility for charging including an electric vehicle charger, etc. in addition to the panel board. For example, an electric vehicle is charged while communicating with an AC/DC converter mounted on an electric vehicle charger. When an overheated portion having a preset critical value or more is detected in a specific portion based on an overcurrent, etc. by monitoring a balanced current state according to the amount of current, applied to an AC/DC converter included in such an electric vehicle charger, in real time, the electric vehicle may be configured to autonomously block an electric circuit. In this case, data may be extracted by applying the contour line datafication analysis method of the present disclosure to the overheated portion.

The embodiment of the system and method for predicting and detecting the outbreak of a fire according to the present disclosure has been described above with reference to the accompanying drawings. However, an embodiment of the present disclosure is not essentially limited to the aforementioned embodiment and may be modified in various ways and implemented within an equivalent range by a person having ordinary knowledge in the art to which the present disclosure pertains. Therefore, a true scope of rights of the present disclosure may be said to be determined by the attached claims.

DESCRIPTION OF REFERENCE NUMERALS

1: electrical facility
10: thermal image camera
11: thermal image camera controller
12: wired and wireless gateway
30: management server
50: panel board casing
100: manager terminal
110: state detection unit
120: detection space photographing unit
130: abnormal state determination unit
150: panel board controller
P: fire outbreak (danger) point

The invention claimed is:
1. A system for predicting and detecting an outbreak of a fire, comprising:
a management server configured to store and output data;
a state detection unit disposed in detection space becoming a target of detection and configured to detect a normal state or an abnormal state within the detection space;

a detection space photographing unit for transmitting, to the management server, a first screen obtained by photographing the detection space in the normal state in which a detected value detected by the state detection unit is less than a set value and a second screen obtained by photographing the detection space in the abnormal state in which a detected value detected by the state detection unit is the set value or more;

an abnormal state determination unit for determining a dangerous situation when a detected value transmitted by the state detection unit is the set value or more and to transmit thermal image data measured through the second screen; and a manager terminal for communicating with the management server.

2. The system of claim 1, wherein the detection space photographing unit has a function for calibrating and compressing the second screen through calibration so that the second screen coincides with a fire outbreak location measured in the thermal image data and transmitting the calibrated and compressed thermal image and location data to the management server.

3. The system of claim 1, wherein the thermal image data measured through the second screen is dataficated in a contour line form by incorporating a temperature distribution at a fire outbreak danger point and transmitted to the management server.

4. The system of claim 3, wherein the datafication of the contour line is calculated using an equation: generated by Relation 1 below $$T(x, y) = T\_max - W * R(R = 0.1 \text{ to } R\_max)$$

x,y: middle temperature coordinates (pixels)
T max: a middle temperature (C)
W: a weight (gain)
R: a radius pixel
R_max: a maximum radius.

5. The system of claim 3, wherein:
when the temperature distribution is measured in an oval form, and datafication of an oval contour line is measured using an equation:

$$T(v, r): (vw) = T(x, y) * r$$
$$: (ve) = T(x, y)$$

x,y: middle temperature coordinates (pixels)
T max: a middle temperature (C)
W: a weight (gain)
R: a radius pixel
R_max: a maximum radius
v: a diffusion vector direction (0 to 8)
r: a minimum and maximum ratio (1:1 to 1:16).

6. The system of claim 5, wherein the datafication of the oval contour line comprises extracting the temperature distribution by integrating a value according to the datafication of the oval contour and fast Fourier transform (FFT) analysis.

7. The system of claim 1, wherein at least one detection space photographing unit is provided and has a function capable of monitoring a given space which is the target to be detected in real time and measuring and transmitting a thermal image.

8. The system of claim 1, wherein the thermal image data comprises at least one of sensor information, a thermal image, and a location of a warning part.

9. The system of claim 1, wherein:
the management server and the manager terminal mutually perform transmission and reception over a wireless network, and
the wireless network is an IoT-based sensor network.

10. The system of claim 1, further comprising a gateway which mediates the transmission of the data from the abnormal state determination unit to the management server.

11. The system of claim 10, wherein communication between the abnormal state determination unit and the gateway comprises any one of wireless communication or wire communication capable of bidirectional communication.

12. The system of claim 1, wherein the abnormal state determination unit comprises:
a fire detection unit disposed in the detection space and configured to detect configuration factor information directly related to a fire; and
an environment detection unit disposed in the detection space and configured to detect environment factor information within the detection space as information other than configuration factor information related to the fire detection unit.

13. The system of claim 12, wherein the abnormal state determination unit
classifies a risk state of the detection space based on a use aspect of the detection space and stores the risk state in the management server, and
transmits, to a user, a risk state level of the detection space detected by the state detection unit and the environment factor information of the detection space when a detected value transmitted by the state detection unit is less than the set value.

14. The system of claim 1, wherein the first screen comprises a video or an image obtained by photographing any one of the detection space in which a user is not present, the detection space in which power is not used, and the detection space in which a user is not present in a time zone separately set by a user through the detection space photographing unit.

15. The system of claim 1, further comprising a controller configured to control a breaker at a corresponding fire outbreak location to be automatically blocked when fire outbreak location data is transmitted from the abnormal state determination unit to the management server or a fire outbreak location is identified by the detection space photographing unit.

* * * * *